United States Patent [19]
Adomeit

[11] Patent Number: 6,129,375
[45] Date of Patent: Oct. 10, 2000

[54] DEVICE FOR PROTECTING MOTOR VEHICLE OCCUPANTS

[75] Inventor: Heinz-Dieter Adomeit, Berlin, Germany

[73] Assignee: Petri AG, Aschaffenburg, Germany

[21] Appl. No.: 09/101,658

[22] PCT Filed: Jan. 17, 1997

[86] PCT No.: PCT/DE97/00115

§ 371 Date: Jul. 14, 1998

§ 102(e) Date: Jul. 14, 1998

[87] PCT Pub. No.: WO97/27084

PCT Pub. Date: Jul. 31, 1997

[30] Foreign Application Priority Data

Jan. 23, 1996 [DE] Germany ............................ 196 04 014

[51] Int. Cl.$^7$ ................................................. B60R 21/22
[52] U.S. Cl. ..................................... 280/730.1; 280/728.3
[58] Field of Search ................................ 280/730.1, 752, 280/728.3, 732

[56] References Cited

U.S. PATENT DOCUMENTS

| | | | |
|---|---|---|---|
| 4,966,388 | 10/1990 | Warner et al. . | |
| 5,048,234 | 9/1991 | Lau et al. . | |
| 5,251,931 | 10/1993 | Semchena et al. | 280/730 |
| 5,447,326 | 9/1995 | Laske et al. | 280/728.3 |
| 5,738,368 | 4/1998 | Hammond et al. | 280/730.1 |
| 5,931,493 | 8/1999 | Sutherland | 280/730.1 |

FOREIGN PATENT DOCUMENTS

| | | |
|---|---|---|
| 0659617 | 5/1995 | European Pat. Off. . |
| 4038659 | 6/1991 | Germany . |
| 4119788 | 7/1992 | Germany . |
| 4307421 | 10/1993 | Germany . |
| 4328528 | 8/1994 | Germany . |
| 5-338514 | 12/1993 | Japan . |
| 2267065 | 11/1993 | United Kingdom . |
| 2272670 | 5/1994 | United Kingdom . |

OTHER PUBLICATIONS

Patent Abstracts of Japan, vol. 018, No. 602 (M–1705), Nov. 16, 1994 & JP 06 227350 A (Toyota Motor Corp), Aug. 16, 1994.

Patent Abstracts of Japan, vol. 095, No. 008, Sep. 29, 1995 & JP 07 117610 A (Toyoda Gosei Co Ltd; Others: 01), May 9, 1995.

*Primary Examiner*—Lanna Mai
*Assistant Examiner*—Lynda Jasmin
*Attorney, Agent, or Firm*—Christie, Parker & Hale, LLP

[57] ABSTRACT

The invention relates to a device for protecting occupants of a motor vehicle in the event of side impact, using an inflatable airbag. The inflatable airbag is fitted behind a rigid, movable door or coachwork trim component. The movable trim component is moved by the inflating airbag towards the vehicle occupant to be protected, and remains between the airbag and the occupant during and after inflation.

18 Claims, 2 Drawing Sheets

DEVICE FOR PROTECTING MOTOR VEHICLE OCCUPANTS

FIELD OF THE INVENTION

The invention relates to a device for protecting motor vehicle occupants.

BACKGROUND OF THE INVENTION

Safety devices for protecting vehicle occupants in the event of side impact through the use of airbags are known. Thus from German Patent 43 07 421 A1 a safety device is known where an airbag is mounted between the hip of a person sitting on a vehicle seat and the door of the vehicle. The inflation device and the airbag are fixed on the vehicle seat so that the position of the airbag in relation to the occupant is not changed when adjusting the seat. This safety device protects in particular the hip area of the vehicle occupant.

Furthermore from German Patent 43 28 528 A1 a vehicle seat is known to which is connected an airbag-impact-protection unit to protect against a side impact of the vehicle. The inflated airbag of this protection unit lies between the head/neck part of the occupant and the immediate adjoining side structure of the vehicle, i.e. the airbag protects inter alia the upper body and the head of the vehicle occupant.

These devices have the drawback that the inflated airbags with which the vehicle occupant comes into direct contact are loaded by the occupant over a small surface since the vehicle occupant has a small surface in a lateral view.

This drawback can be overcome through a vehicle door which absorbs energy as known from German Patent 40 38 659 A1. This vehicle door consists of an outer and inner panel which are fixed against each other. Between these is a space for attaching the window lifter and other component parts stored in the door. A door cover panel assembly attached to the inner panel contains a cover panel of a substantially rigid material. Between the inner panel and cover panel is an energy-absorbing crumple element. This element crumples in the event of side impact and thereby absorbs the energy which arises. The cover panel has structurally weakened sections, preferably slits whereby the cover panel yields in a foreseen way in the event of side impact. In the event of side impact the vehicle occupant makes contact with the rigid cover panel so that the load of the occupant is spread out over a larger surface area.

The drawback with this vehicle door is that the door is very thick owing to the energy absorbing material additionally required so that the passenger space becomes reduced.

SUMMARY OF THE INVENTION

The object of the present invention is, with a side impact protection device which uses an inflatable airbag, to spread out over a larger surface area of the airbag the load on the inflated airbag by the occupant in the event of side impact.

With a device for protecting vehicle occupants in the event of side impact using an inflatable airbag which is mounted behind a rigid movable trim part of a door or coachwork trim whereby the movable trim part is movable through the inflating airbag towards the vehicle occupant who is to be protected and wherein the movable trim part, during inflation and after inflation of the airbag, remains between this airbag and the vehicle occupant, according to the invention the movable airbag consists of several sections which are connected together for articulated movement and which can be brought from a rest position curved towards the folded airbag through the inflating airbag into an opposite position facing the vehicle occupant who is to be protected.

This device has the advantage that the inflatable airbag is to be stored as an energy-absorbing component in the non-inflated state in a conventional vehicle door or in a conventional vehicle coachwork part so that the inner space of the vehicle is not restricted. On the other hand the vehicle occupant in the event of side impact does not come into direct contact with the airbag but with the rigid trim part provided between him and the airbag. This causes the load of the occupant to be spread out over a larger surface area of the airbag than if a part of the body were to directly enter the airbag.

The articulated joints thereby run substantially parallel and it is preferable that the articulated joints run at least approximately vertical.

The mobility of the trim part is made possible in particular in that the trim part can be torn off at least over a section of its edge from the adjoining trim through the inflating airbag.

With this embodiment the top and bottom edges of the movable trim part tear off from the surrounding trim during inflation of the airbag. The sections which are connected together for articulated movement then snap under the influence of the inflating airbag out of the rest position over a central unstable position into a second stable position facing the vehicle occupant. With this process at least some sections sag elastically.

The movement of the movable trim part in the direction of the occupant is thus not restricted by the occupant but by movable sections of the trim part. Preferably a larger central section is provided on which smaller sections are attached on each side in the longitudinal direction of the vehicle. The airbag can extend during inflation down and up beyond the trim part.

In one embodiment, it is preferable that the movable trim part is four-sided.

The trim consists preferably of a light structural material. It is proposed in particular that the trim consists of hemp or flax pressed with epoxy resin wherein the trim is free of epoxy resin on the tear edges and on the hinge-like edges. On the one hand the movable trim part thereby receives sufficient stiffness and on the other as a result of the material properties of the hemp or flax at the joint and tear spots, sufficient mobility and tear ability are also achieved. Whether the one or other is achieved can be influenced through different pressing forces at these points as well as through the different material strengths.

The movable trim part can extend for example as a component part of the trim of a door in the vertical direction between the armrest and window and in the longitudinal direction of the vehicle between the handle and a door pillar.

The movable trim part preferably has a smaller base surface than the inflated airbag. The process thereby demands that the inflated airbag extends beyond the movable trim part.

BRIEF DESCRIPTION OF THE DRAWINGS

The invention will now be explained in further detail with reference to embodiments shown in the drawings in which.

DETAILED DESCRIPTION

Figure 1:
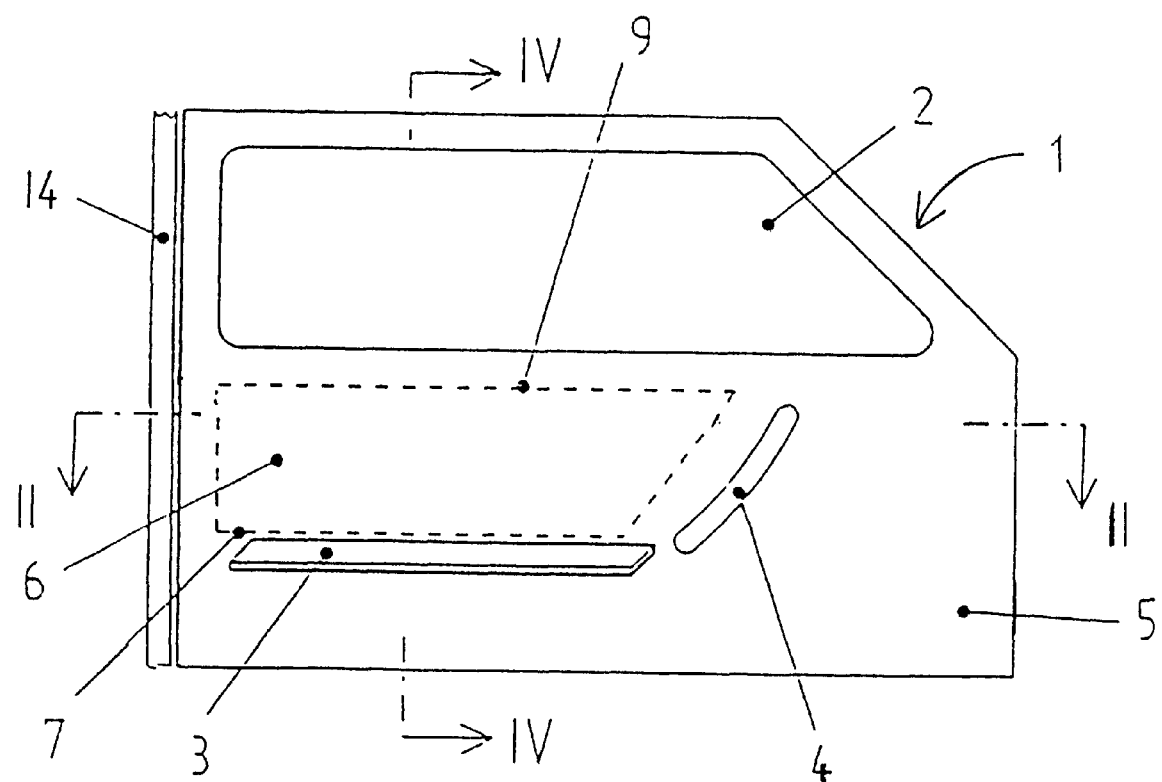
FIG. 1 is a view of a vehicle door seen from inside.

A vehicle door 1, in the present case a front door, has in known way a window 2, an armrest 3 and a handle 4. The door is provided with an inner trim which according to the invention consists of a fixed trim part 5 and a movable trim part 6. This movable trim part extends in the present embodiment on one side between the window 2 and armrest 3 and on the on the other side between the handle 4 and rear end of the door which is associated with the B-pillar 14 of the motor vehicle. The movable trim part 6 and the fixed trim part 5 are made in one piece. During manufacture tear edges 7, 9 and a side hinge-like connections (FIG. 2) are provided between the two. These are taken into account in known way when manufacturing the trim e.g. the material is made weaker at these points.

Figure 2:
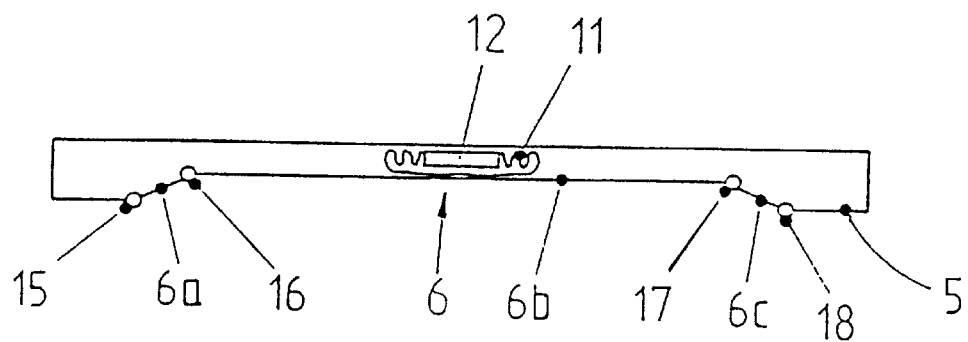
FIG. 2 shows a longitudinal section through the door according to the line II—II of FIG. 1 with a movable trim part and with a folded airbag.

It can be seen from FIG. 2 that an airbag 11 with gas generator 12 is mounted in the vehicle door 1 behind the movable trim part 6. In FIG. 2 the airbag is shown in the folded state. It can further be seen that the movable trim part comprises several sections 6a, 6b, 6c connected together by articulated joints 15, 16, 17, 18. In the rest state the central section 6b lies set back from the surrounding trim, i.e. seen from the vehicle occupant it lies further out than the surrounding trim, as shown in FIG. 2. In the rest state, the several sections 6a, 6b, 6c are one of curved in the direction of the airbag and angled inwardly in the direction of the airbag.

Figure 3:
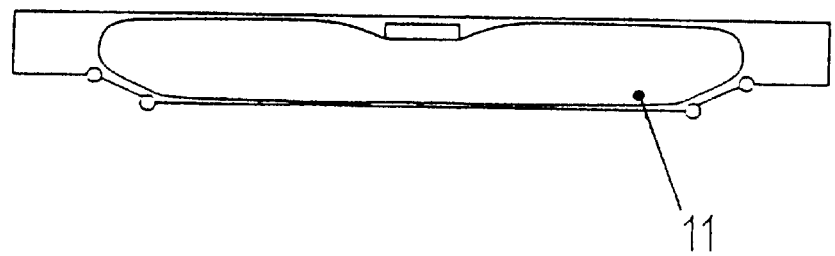
FIG. 3 shows a section according to FIG. 2 with the inflated airbag.

If now in the event of side impact the gas generator is ignited, through the inflation of the airbag the sections 6a, 6b, 6c of the movable trim part are pressed into the inside of the vehicle whereby they are torn away from the surrounding trim top and bottom along the tear edges 7 and 9. The sections 6a, 6b, 6c thereby snap out of the stable position into a second stable position (FIG. 3). On passing through a middle unstable position (not shown) the said sections sag elastically and thus allow the transition into the second stable position.

The inflating airbag can extend up and down over the sections 6a, 6b, 6c. It can be seen from FIG. 5 that the airbag extends up into the window area and thus additionally protects the vehicle occupant from impact with the window 2.

Figures 4, 5:
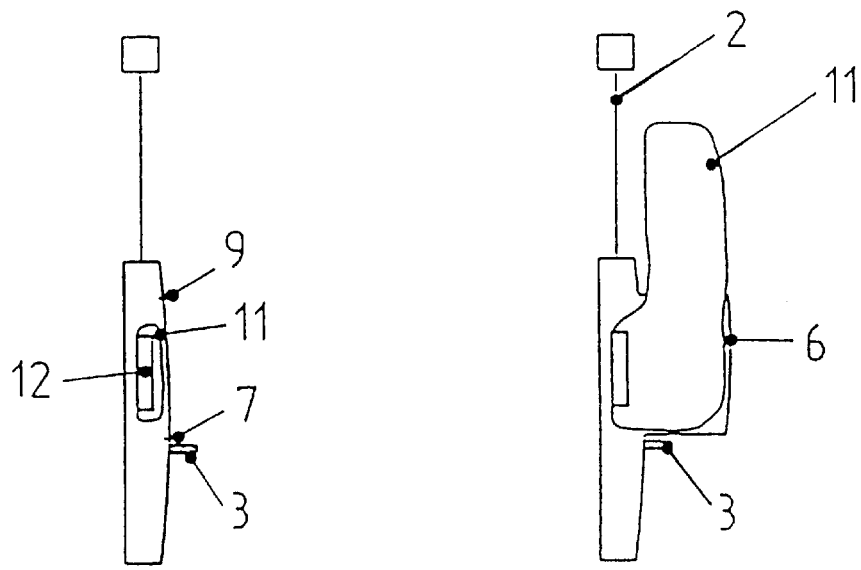
FIG. 4 is a sectional view through the door according to line IV—IV of FIG. 1 with folded airbag.
FIG. 5 shows a section according to FIG. 4 with an inflated airbag.

FIG. 4 shows a section through the vehicle door according to FIG. 5 with folded airbag.

What is claimed is:

1. Device for protecting a vehicle occupant in the event of side impact by using an inflatable airbag, the device comprising:

a rigid movable trim part of a vehicle door or coachwork trim, behind which the airbag is mounted, wherein the movable trim part can be moved by the inflating airbag towards the vehicle occupant being protected, and wherein the movable trim part, during inflation and after inflation of the airbag, remains between the airbag and the vehicle occupant, wherein the movable trim part comprises several sections which are connected together for articulated movement, which can be brought from a rest position, protruding inwardly in the direction of the airbag, through the inflating of the airbag into an opposite position facing the vehicle occupant who is to be protected, wherein the several sections are sufficiently rigid in the rest position to hold the movable trim part in the rest position until inflation of the airbag.

2. Device according to claim 1 wherein the several sections are connected together by articulated joints, and wherein the articulated joints run at least approximately perpendicular to a vehicle longitudinal direction.

3. Device according to claim 2 wherein the several sections comprise a central larger section, to which smaller sections are connected on each side of the central larger section in the longitudinal direction of the vehicle.

4. Device according to claim 1 wherein the movable trim part can be torn off at least over a section of its edge from an adjoining fixed trim part by the inflating airbag.

5. Device according to claim 4 wherein the movable trim part is four-sided.

6. Device according to claim 4 wherein at least one of the movable and fixed trim part is made from light structural material.

7. Device according to claim 1 wherein the movable trim part extends as a component part of a vehicle door trim in a vertical direction between an arm rest and a window, and in the vehicle longitudinal direction between a handle and a door pillar.

8. Device according to claim 1 wherein the movable trim part has a smaller base surface than the inflated airbag.

9. Device according to claim 1 wherein in the rest position, the several sections are curved in the direction of the airbag.

10. Device according to claim 1 wherein in the rest position, the several sections are angled inwardly in the direction of the airbag.

11. Device according to claim 1 wherein one of the several sections of the movable trim part is parallel to a vehicle door trim when the airbag is inflated, such that forces from the airbag are spread along the occupant.

12. A device for protecting a vehicle occupant in a side impact by using an inflatable air bag, the device comprising a movable trim part of a vehicle door or coachwork trim, behind which the air bag is mounted;

the movable trim part having:

at least one section with an inward position adjacent the air bag, and an outward position toward the vehicle occupant, wherein said at least one section can be moved by the inflating air bag to the outward position, and wherein during and after inflation of the air bag said at least one section remains between the airbag and the vehicle occupant; and at least one further section connected with said at least one section, wherein said at least one further section allows the at least one section to be moved from the inward position to the outward position during deployment of the air bag, and wherein said at least one further section retains said at least one section in the inward position until said at least one section is moved by the air bag and limits said at least one section in the outward position.

13. The device according to claim 12 wherein said at least one further section is rigid.

14. The device according to claim 12 wherein said at least one further section is pivotal.

15. The device according to claim 12 wherein said at least one further section has first and second sections on opposite sides of said at least one section.

16. Device for protecting a vehicle occupant in the event of side impact by using an inflatable airbag, the device comprising:

a movable trim part of a vehicle door or coachwork trim, behind which the airbag is mounted, wherein the movable trim part can be moved by the inflating airbag towards the vehicle occupant being protected, and wherein the movable trim part, during inflation and after inflation of the airbag, remains between the airbag and the vehicle occupant, wherein the movable trim part comprises several sections which are connected together for articulated movement, and which can be brought from a rest position, protruding inwardly in the direction of the airbag, through the inflating of the airbag into an opposite position facing the vehicle occupant who is to be protected, wherein the several sections are connected together by articulated joints, and wherein the articulated joints run at least approximately perpendicular to a vehicle longitudinal direction.

17. Device according to claim 16 wherein the several sections comprise a central larger section, to which smaller sections are connected on each side of the central larger section in the longitudinal direction of the vehicle.

18. Device for protecting a vehicle occupant in the event of side impact by using an inflatable airbag, the device comprising:

a movable trim part of a vehicle door or coachwork trim, behind which the airbag is mounted, wherein the movable trim part can be moved by the inflating airbag towards the vehicle occupant being protected, and wherein the movable trim part, during inflation and after inflation of the airbag, remains between the airbag and the vehicle occupant, wherein the movable trim part comprises several sections which are connected together for articulated movement, and which can be brought from a rest position, protruding inwardly in the direction of the airbag, through the inflating of the airbag into an opposite position facing the vehicle occupant who is to be protected, wherein the movable trim part extends as a component part of a vehicle door trim in a vertical direction between an arm rest and a window, and in the vehicle longitudinal direction between a handle and a door pillar.

* * * * *